Jan. 12, 1943.  C. P. DEIBEL  2,307,761
DRY CELL BATTERY UNIT
Filed June 21, 1941   2 Sheets-Sheet 1
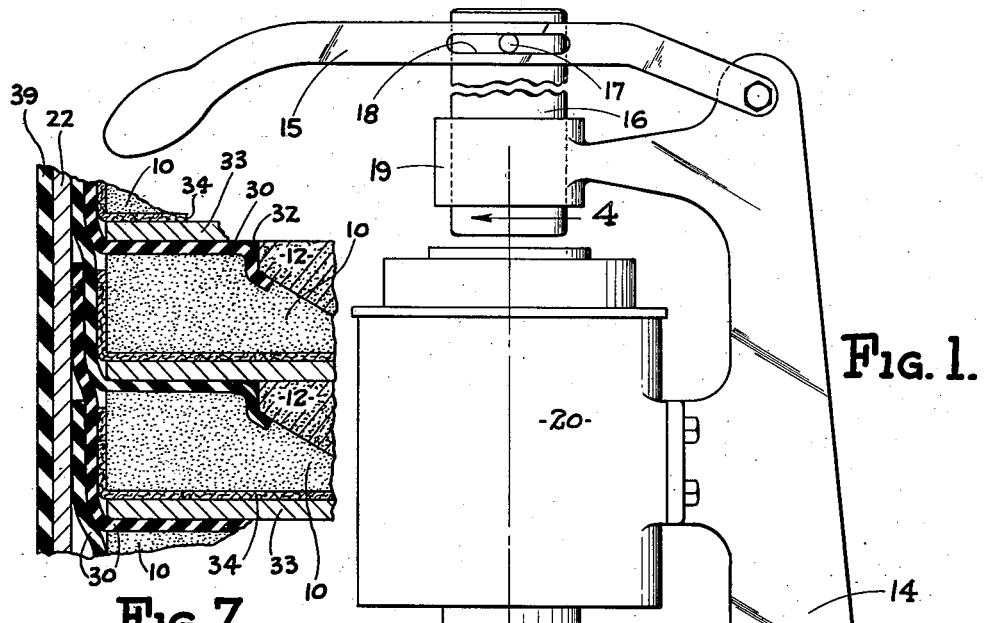
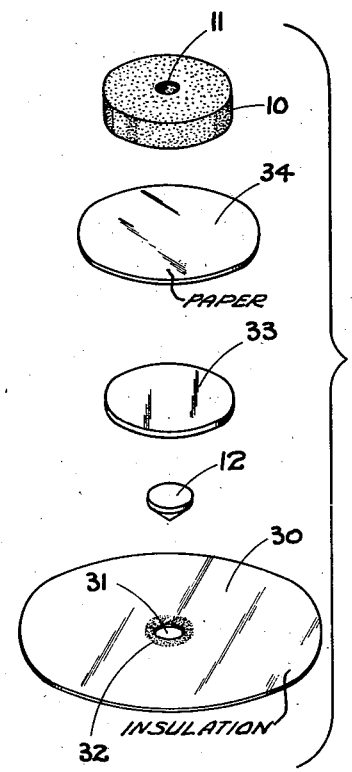
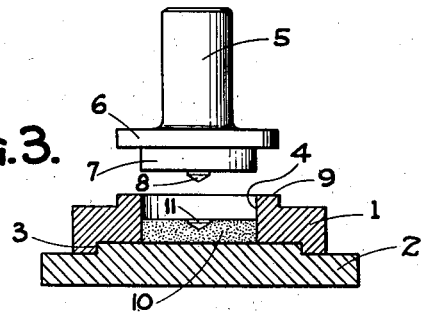
INVENTOR
CYRIL P. DEIBEL
BY William E. Chilton
ATTORNEY.

Jan. 12, 1943.  C. P. DEIBEL  2,307,761
DRY CELL BATTERY UNIT
Filed June 21, 1941  2 Sheets-Sheet 2
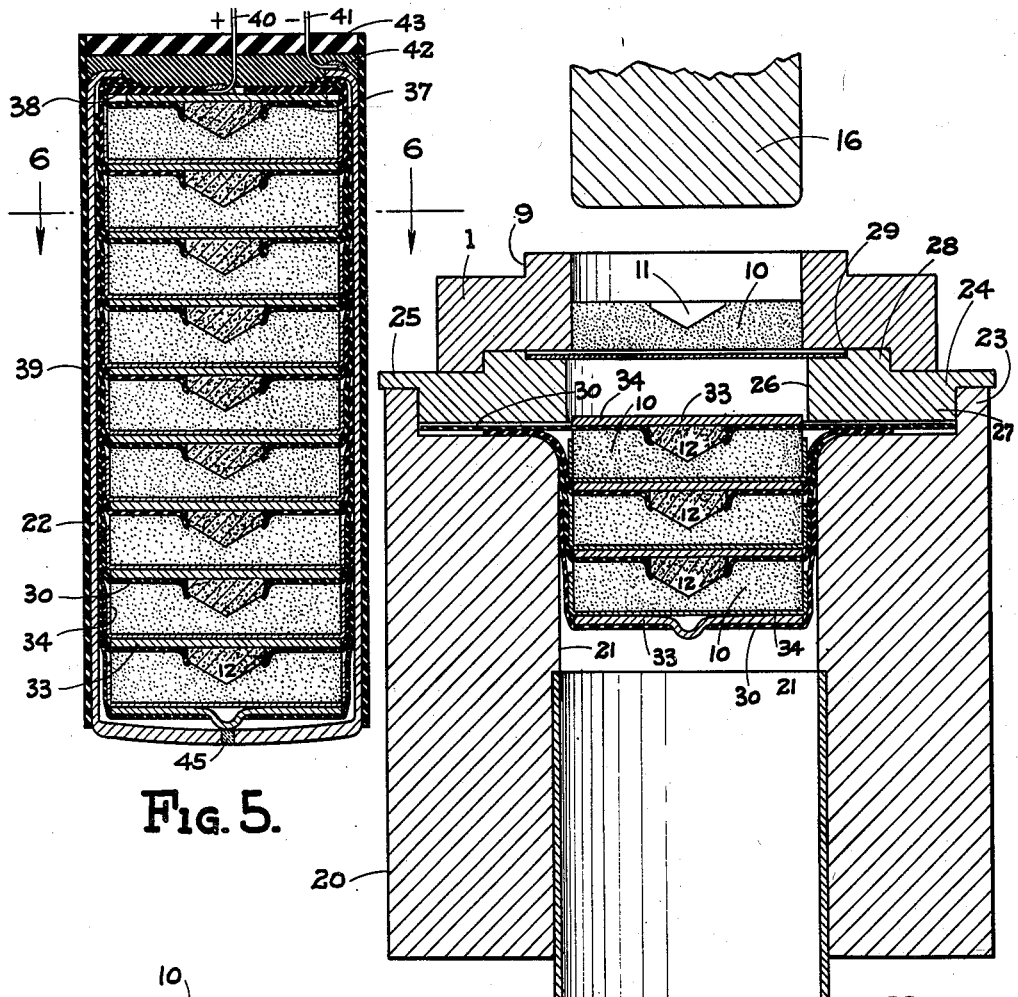
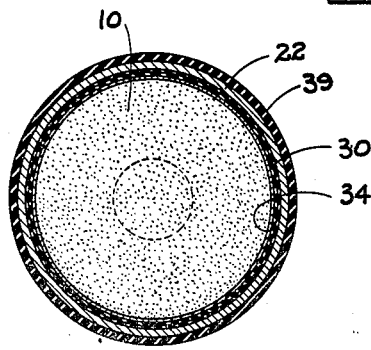
INVENTOR.
CYRIL P. DEIBEL
BY William E. Chilton
ATTORNEY.

Patented Jan. 12, 1943

2,307,761

UNITED STATES PATENT OFFICE 2,307,761

DRY CELL BATTERY UNIT

Cyril P. Deibel, Lakewood, Ohio

Application June 21, 1941, Serial No. 399,196

16 Claims. (Cl. 136—111)

This invention relates to a dry cell battery unit which is made up of a plurality of separate dry cells sealed within an outer casing in such a manner that the likelihood of leakage of electrolyte is reduced to a minimum, and which is particularly well adapted for use with hearing aids, portable radios or the like where space is at a premium and where a leak-proof battery is desirable.

One of the objects of the invention is to provide a dry cell battery unit which contains the maximum quantity of active materials and a minimum quantity of inactive materials and which has a high potential and a relatively high capacity.

Another object of the invention is to provide a dry cell battery unit comprising a metal casing in which are arranged a plurality of dry cells which are held in electrical contact with each other under pressure, each cell being enclosed within a layer of insulating material and individually sealed in liquid tight relation with each other.

A further object of the invention is to provide a dry cell battery unit having the above described distinctive characteristics and features and in which the number of soldered connections are reduced to a minimum and which will give a maximum of service hours and have a relatively long shelf life as well as an active life.

A still further object of the invention is to provide a dry cell battery unit of the character described which may be made in any particular size or shape and which may consist of any desired number of cells to give the desired voltage and capacity.

A further object of the invention is to provide a dry cell battery unit which comprises a metal casing containing a plurality of wafer-like dry cells arranged therein in stacked relation and connected in series, each cell comprising a zinc electrode, a mass of mix containing an electrolyte and a carbon electrode, the upper surface of the carbon electrode of each cell being embedded in the adjacent mass of mix and having an exposed surface having electrical contact with the zinc electrode of the next adjacent cell, each cell being also encased within a thin layer of insulating material, such as "Pliofilm" or the like, in liquid-tight relation therewith and sealed to the carbon electrode of the next adjacent cell, the zinc electrode of the lowermost cell having electrical contact with the metal casing and the carbon electrode of the uppermost cell having sealed engagement with the next adjacent layer of Pliofilm and having a terminal leading therefrom and a terminal leading from the metal casing. Pliofilm is a hydrochlorinated rubber, that is, rubber to which hydrogen chloride has been added. Pliofilm is strong, somewhat stretchable, tear resistant, impervious to moisture and gas and resistant to oil and hydrocarbons. Pliofilm has the quality of being sealed by fusion when heat is applied thereto. Other materials having the desirable qualities of Pliofilm of course may be used.

A still further object of the invention is to provide a dry cell battery unit having the above described distinguishing features and characteristics and which is simple in construction and well adapted for quantity production at a minimum cost.

Further and more limited objects of the invention will appear as the description proceeds and by reference to the accompanying drawings in which Fig. 1 is a view in side elevation of an apparatus for constructing and assembling the dry cell battery unit herein described; Fig. 2 is a disassembled view disclosing the several parts which go to make up each cell; Fig. 3 is a vertical sectional view showing the apparatus for forming the cake of mix which forms a part of each cell; Fig. 4 is a vertical sectional view taken on the line 4—4 of Fig. 1; Fig. 5 is a vertical sectional view of the completed dry cell battery unit; Fig. 6 is a horizontal sectional view on the line 6—6 of Fig. 5; and Fig. 7 is a greatly enlarged view of a portion of Fig. 5 to more clearly illustrate the construction of the cells and their relation relative to one another.

Referring now to the drawings, the reference character 1 designates a mold for forming the mix cake (see Fig. 3) which is adapted to be supported upon any suitable support 2 which has an upstanding central portion 3 which fits within the recess provided in the mold. The mold 1 has a centrally disposed bore 4 therein. Mix of the desired consistency preferably in powdered form and containing electrolyte is poured into the bore 4 to fill the same. Any additional mix is struck off. A plunger 5 is then forced into the bore 4 to compress the powdered mix 10 into the cake form shown in Fig. 3. The plunger has thereon a flange 6 and a downwardly depending portion 7. The plunger 5 is provided with a downwardly extending tapered nose portion 8 which forms a depression in the top of the mix cake. The plunger is depressed until the flange 6 strikes against the shoulder 9 on the form 1 with the result that a mix cake 10 is formed having a central depression 11 therein which is adapted to receive a carbon button 12.

One form of apparatus for forming and assembling the cells within the battery will now be described. (See Fig. 1).

The reference character 13 designates a base or supporting member to which is secured a press which comprises a bracket 14 to which is pivotally secured an arm 15. Carried by the arm 15 is a plunger 16 having ears 17 thereon which engage in slots 18 provided in the arm 15. Carried by or formed integrally with the bracket 14 is a guiding member 19 having a central bore therein which receives therethrough the plunger 16. Also carried by the bracket 14 is a block 20 (see Fig. 4) having an axially extending bore 21 therein the lower end of which is slightly enlarged and adapted to receive therein an extruded zinc can or casing 22 in the position shown in Fig. 4. The block 20 is recessed at its upper end and has a peripheral shoulder 23 thereon. Fitting within the recess provided in the upper end of the block 20 is a guiding member 24 having a peripheral flange 25 thereon which rests on the shoulder 25. The guiding member 24 is of substantial thickness and has a centrally disposed bore or opening 26 therein. The guiding member 24 also has a depending portion 27 which fits within the recess in the block 20 and serves to position the same therein. The guiding member 24 is also provided on its upper side with an upstanding shoulder 28 which provides a recessed central portion 29. The guiding member is adapted to receive thereover the form or mold 1, which contains the mix cake 10. As the guide member 24 has a recess 29 in the top thereof, a slight space is provided between the top surface of the guiding member 24 and the lower face of the mold 1.

Each cell comprises a thin layer or disk 30 of suitable insulating material, such as Pliofilm or the like, having a central opening 31 therein. Each carbon button 12 is disposed within the opening 31 and has an exposed surface which is secured to the adjacent layer of Pliofilm in liquid-tight relation by a thin layer or coating 32 of cement or other suitable liquid proof adhesive. Disposed over the layer of Pliofilm and centrally positioned thereon and engaging the carbon button 12 is a zinc disk or electrode 33. Disposed over the zinc electrode 33 is a layer or disk of battery paper 34 which is formed into a cup in a manner to be hereinafter described and which receives the mix cake 10 therein. The carbon button is omitted from the lowermost layer of Pliofilm and the lowermost zinc electrode may, if desired, be deflected downwardly through the opening in the lowermost layer of Pliofilm so as to insure good electrical contact with the bottom of the shell 22.

The steps of forming the cells and assembling the battery unit will now be described: first, the outer casing 22 is inserted into the block 20 in the position shown in Fig. 4. A slide 35 secured to the support 13 by bolts 36 is then pulled outwardly to the position shown in Fig. 1 to hold the container in place; then a layer or disk 30, of Pliofilm or the like, without the carbon button secured thereto but having the central opening 31 therein, is disposed over the bore 21 in the block 20. The bore 21 is slightly larger than the outside diameter of each cell and the upper end of the bore is rounded or slightly enlarged so as to properly guide the layers of Pliofilm thereinto. The guiding member 24 to the bottom of which has previously been applied a thin layer or film of oil is then placed over the peripheral shoulder 23. The zinc disk 33 is then centrally positioned over the opening 31 in the layer of Pliofilm, although this disk may be placed over the opening before the layer of Pliofilm is placed over the bore 21. The disk of battery paper 34 is then placed over the opening 26 in the member 24, the walls of the recessed central portion 29 serving to properly position the same. The mold 1 with the mix cake 10 therein is then placed over the member 24 in the position shown in Fig. 4. The plunger 16 is then depressed, which forces the mix cake and the paper disk 34 downwardly against the Pliofilm disk and simultaneously folds the paper disk about the mix cake. As the plunger 16 is further depressed the bottom of the cup-shaped paper disk engages the zinc disk 34 and forces it together with the Pliofilm disk 30 downwardly. The walls of the bore 21 serve to fold the Pliofilm disk about the mix cake. The plunger is depressed sufficiently far to force the mix cake downwardly to a point slightly below the plane of the recessed upper end of the block 20. The mold 1 and the member 24 are then removed and a second Pliofilm disk is positioned over the bore 21. This disk of Pliofilm has the carbon button 12 secured in the central opening 31 and cemented thereto so that it will enter the depression 11 in the previously inserted mix cake.

The member 24 is then again placed over this layer of Pliofilm and another zinc disk 33 is dropped within the bore 26 so as to rest on the carbon button 12. A second disk of battery paper 34 is then placed within the recess 29. The mold 1, or a similar mold with the mix cake therein, is then placed over the member 24. The plunger 16 is again depressed which forces the mix cake 10 and the battery paper 34 downwardly into the bore 26, thereby folding the paper disk about the mix cake. As the plunger is further depressed, the paper disk engages the adjacent lower layer of Pliofilm and moves it downwardly into the bore 21. The carbon button 12 enters the central depression 11 in the mix cake. The plunger is further depressed to a position to force this mix cake downwardly to a point slightly below the plane of the bottom of the member 24. These operations are repeated in succession until the required number of cells have been formed and inserted into the casing 22.

It will be noted that the diameter or size of each Pliofilm disk is such that when it is folded upwardly about the next adjacent mix cake, it extends to a point near the top of the next adjacent cell, or in other words, a Pliofilm layer overlaps each next adjacent cell for a substantial distance. As each layer of Pliofilm has a coating or film of oil applied thereto as it moves over the lower face of the member 24, it adheres to the next adjacent layer of Pliofilm and tends to provide a liquid-tight seal. The required number of cells are formed and inserted into the casing 22 until the casing is filled to about the level shown in Fig. 5. Sufficient pressure is applied to the cells through the plunger 16 so as to insure intimate electrical contact between adjacent cells.

After the last cell is inserted in the casing 22, a thin metal disk 37 is placed over the last layer of Pliofilm in contact with the uppermost carbon button 12. An insulating disk 38 is then placed over the metal disk 37 which has a central opening therein. The metal casing with the cells therein is then placed within a suitable fixture and the cells placed under compression with considerable pressure. With the cells held in this condition, the upper edge of the metal casing is deflected over inwardly to hold the cells in place in electrical contact with each other. Any excess Pliofilm which may project from the top of the battery unit may then be trimmed off although that operation may be performed before the upper edge of the casing is turned over. The metal casing is then enclosed within an insulating jacket 39. A terminal 40 is then soldered or otherwise secured to the metal plate 37 and a terminal 41 is secured to the metal casing 22. A seal 42 of asphalt or the like is then poured over the top of the battery unit and seals both the metal casing and the outer jacket. A second seal 43 preferably formed of wax or other hard material is then poured over the top of the first seal. These two seals serve to thoroughly close both the insulating jacket and the metal casing. The lower seal 42 is formed of asphalt or the like and is of such character that excessive pressure may be relieved therethrough without permitting the ingress of outside air.

It will be seen that each cell is progressively formed and projected into the outer casing successively and simultaneously with the forming operation thereof, and that each cell is also simultaneously enclosed within a thin layer of insulating material which is slightly distensible and impervious to moisture and which has liquid tight engagement with each carbon electrode so as to prevent the escape of the liquid contents of the cell. The lowermost cell is disposed in electrical contact with the metal casing and the remaining cells are insulated therefrom. The lower end of the metal casing 22 is provided at its bottom with an opening 44 which permits the air to escape from the casing as the cells are projected therein. This opening is preferably closed by a drop of solder 45 when the battery is completed.

The layers of Pliofilm have a thickness of approximately 2/1000 of an inch and therefore occupy very little space, thus permitting a maximum quantity of active materials to be used. While I prefer to use Pliofilm, it is of course understood that I may make use of any thin insulating material having the above described qualities and characteristics. It will be noted that each cell is separately and individually encased within the layer of insulating material and that each layer of insulating material has liquid tight contact with the carbon electrode of the adjacent cell so as to prevent the electrolyte from escaping around the carbon electrode and contacting the adjacent zinc electrode. The lowermost zinc electrode is secured in intimate electrical contact with the bottom of the metal casing and all of the other cells are thoroughly insulated from the metal casing, and all of the cells are maintained within the casing under considerable pressure, thereby insuring intimate electrical contact between the carbon electrode and the zinc electrode of adjacent cells.

It is of course to be understood that the outer metal casing may be of any desired size or shape so as to receive the desired number of cells therein. The particular size of the individual cells may also be varied as the exigencies of the occasion may demand. Various other changes may be made in the shape, size and arrangement of parts as well as in the specific materials used and in the specific steps of the method employed without departing from the spirit of my invention.

It will now be clear that I have provided a dry cell battery unit and method of making the same which will accomplish the objects of the invention as hereinbefore stated. It is to be understood that the embodiment of the invention herein disclosed is to be considered merely as illustrative and not in a limiting sense as the invention is limited only in accordance with the scope of the appended claims. In my co-pending application Serial No. 399,197, filed June 21, 1941, there is claimed the method of forming and assembling the dry cell battery unit herein disclosed.

Having thus described my invention, what I claim is:

1. A dry cell battery unit comprising a metal casing, a plurality of dry cells arranged within said casing, each cell comprising a negative electrode, a mass of mix containing an electrolyte and a carbon electrode, a thin layer of insulating material enveloping and insulating each cell but permitting series connection between adjacent cells, each of said carbon electrodes being partially embedded in the adjacent mass of mix and having an exposed surface having electrical contact with the next adjacent cell, and a thin layer of sealing material securing each of said layers of insulating material to the next adjacent carbon electrode in liquid tight relation.

2. A dry cell battery unit comprising a metal casing, a plurality of dry cells arranged within said casing, each cell comprising a negative electrode, a mass of mix containing an electrolyte and a carbon electrode, a thin layer of insulating material enveloping and insulating each cell but permitting series connection between adjacent cells, each of said carbon electrodes being partially embedded in the adjacent mass of mix and having an exposed surface having electrical contact with the next adjacent cell, and a thin layer of sealing material securing each of said layers of insulating material to the next adjacent carbon electrode in liquid tight relation, the lowermost negative electrode having electrical contact with said metal casing and the remaining negative electrodes being insulated therefrom, and means holding all of said cells in contact with each other under pressure.

3. A dry cell battery unit comprising a metal casing, a plurality of dry cells arranged within said casing, each cell comprising a negative electrode, a mass of mix containing an electrolyte and a carbon electrode, a thin layer of insulating material enveloping and insulating each cell but permitting series connection between adjacent cells, each of said carbon electrodes being partially embedded in the adjacent mass of mix and having an exposed surface having electrical contact with the next adjacent cell, and a thin layer of sealing material securing each of said layers of insulating material to the next adjacent carbon electrode in liquid tight relation, the lowermost negative electrode having electrical contact with said metal casing and the remaining negative electrodes being insulated therefrom, and means holding all of said cells in contact with each other under pressure, a metal contact member disposed over and contacting the upper carbon electrode and having a terminal connected therewith and a terminal connected with said metal casing.

4. A dry cell battery unit comprising a metal casing, a plurality of dry cells arranged within said casing, each cell comprising a negative electrode, a mass of mix containing an electrolyte and a carbon electrode, a thin layer of insulating material enveloping and insulating each cell but permitting series connection between adjacent cells, each of said carbon electrodes being partially embedded in the adjacent mass of mix and having an exposed surface having electrical contact with the next adjacent cell, a thin layer of sealing material securing each of said layers of insulating material to the next adjacent carbon electrode in liquid tight relation, the lowermost negative electrode having electrical contact with said metal casing and the remaining negative electrodes being insulated therefrom, means holding all of said cells in contact with each other under pressure, a metal contact member disposed over and contacting the upper carbon electrode and having a terminal connected therewith and a terminal connected with said metal casing, a layer of sealing material closing the upper end of said casing, an insulating jacket enclosing said metal casing, and a layer of sealing material closing the upper end of said jacket.

5. A dry cell battery unit comprising an outer metal casing, a plurality of small wafer-like dry cells arranged within said casing and held in electrical contact with each other under pressure, each cell comprising a zinc electrode, a mass of mix containing an electrolyte and a carbon electrode which is embedded in the adjacent mass of mix and has an exposed surface contacting the next adjacent cell, a thin layer of Pliofilm or the like enveloping and insulating each cell but permitting series connection between adjacent cells, and means providing a liquid tight seal between each carbon electrode and the next adjacent layer of Pliofilm.

6. A dry cell battery unit comprising an outer metal casing, a plurality of small wafer-like dry cells arranged within said casing and held in electrical contact with each other under pressure, each cell comprising a zinc electrode, a mass of mix containing an electrolyte and a carbon electrode which is embedded in the adjacent mass of mix and has an exposed surface contacting the next adjacent cell, a thin layer of Pliofilm or the like enveloping and insulating each cell but permitting series connection between adjacent cells, means providing a liquid tight seal between each carbon electrode and the next adjacent layer of Pliofilm, the lowermost zinc electrode having electrical contact with said metal casing and the remaining zinc electrodes being insulated therefrom, a terminal leading from the uppermost carbon electrode, and a terminal leading from said metal casing.

7. A dry cell battery unit comprising a metal casing, a plurality of dry cells arranged within said casing and held in electrical contact with each other under pressure, each cell comprising a zinc electrode and a mass of mix having a carbon electrode embedded therein, a thin insulating cup receiving said zinc electrode and mass of mix and carbon electrode therein, the carbon electrode of each cell being secured in liquid tight sealed engagement with the next adjacent insulating cup, each insulating cup enveloping and insulating each cell but permitting series connection between adjacent cells.

8. A dry cell battery unit comprising a metal casing, a plurality of dry cells arranged within said casing and held in electrical contact with each other under pressure, each cell comprising a zinc electrode and a mass of mix having a carbon electrode embedded therein, a thin insulating cup receiving said zinc electrode and mass of mix and carbon electrode therein, the carbon electrode of each cell being secured in liquid tight sealed engagement with the next adjacent insulating cup, each of said insulating cups extending over and engaging the next adjacent insulating cup and having sealed engagement therewith, but permitting series connection between adjacent cells.

9. A dry cell battery unit comprising a metal casing, a plurality of dry cells arranged within said casing and held in electrical contact with each other under pressure, each cell comprising a zinc electrode and a mass of mix having a carbon electrode embedded therein, a thin insulating cup receiving said zinc electrode and mass of mix and carbon electrode therein, the carbon electrode of each cell being secured in liquid tight sealed engagement with the next adjacent insulating cup, each insulating cup enveloping the adjacent cell but permitting series connection between adjacent cells, the lowermost zinc electrode having electrical contact with said metal casing, the remaining zinc electrodes being insulated from said metal casing.

10. A dry cell battery unit comprising a metal casing, a plurality of dry cells arranged within said casing and held in electrical contact with each other under pressure, each cell comprising a zinc electrode and a mass of mix having a carbon electrode embedded therein, a thin insulating cup receiving said zinc electrode and mass of mix and carbon electrode therein, the carbon electrode of each cell being secured in liquid tight sealed engagement with the next adjacent insulating cup, each of said insulating cups extending over and engaging the next adjacent insulating cup and having sealed engagement therewith but permitting series connection between adjacent cells, the upper end of said metal casing having an inwardly directed portion holding the zinc electrode of each cell in electrical contact with the carbon electrode of the next adjacent cell.

11. A dry cell battery unit comprising a metal casing, a plurality of wafer-like dry cells arranged within said metal casing in stacked relation and connected in series, each cell comprising a zinc electrode, a cup-shaped member formed of battery paper and containing a mass of mix, an electrolyte, and a carbon button embedded in said mix and having an exposed upper surface, a thin layer of Pliofilm or the like enveloping each cell and insulating the same but permitting series connection between adjacent cells, and held in sealed relation with the next adjacent carbon button and preventing the escape of the liquid contents of the cell.

12. A dry cell battery unit comprising a metal casing, a plurality of wafer-like dry cells arranged within said metal casing in stacked relation and connected in series, each cell comprising a zinc electrode, a cup shaped member formed of battery paper and containing a mass of mix, an electrolyte, and a carbon button embedded in said mix and having an exposed upper surface, a thin layer of Pliofilm or the like enveloping each cell and insulating the same but permitting series connection between adjacent cells, and held in sealed relation with the next adjacent carbon button and preventing the escape of the liquid contents of the cell, each of said layers of Pliofilm being cup shaped and extending over and in contact with the layer of Pliofilm of the next adjacent cell, the lowermost zinc electrode having electrical contact with said metal casing, the remaining zinc electrodes being insulated from said casing, a terminal leading from the uppermost carbon button, a terminal leading from said metal casing, an insulating jacket enclosing said metal casing, and means sealing said jacket and metal casing.

13. A dry cell battery unit comprising a metal casing containing a plurality of dry cells arranged in stacked relation and connected in series, each cell comprising a zinc electrode, a mass of mix containing an electrolyte and a carbon electrode the upper surface of which is held in electrical contact with the zinc electrode of the next adjacent cell, a thin layer of insulating material surrounding each cell in liquid tight relation and extending upwardly over the next adjacent upper cell, the zinc electrode of the lowermost cell having electrical contact with said metal casing, the carbon electrode of the uppermost cell having an exposed surface having sealed engagement with the next adjacent layer of insulating material and having a terminal leading therefrom, and a terminal leading from said metal casing.

14. A dry cell battery unit comprising a metal casing containing a plurality of dry cells arranged in stacked relation and connected in series, each cell comprising a zinc electrode, a mass of mix having a carbon electrode embedded therein, said carbon electrode having an exposed surface contacting the zinc electrode of the next adjacent cell, a thin insulating cup containing each cell and extending upwardly around and contacting the adjacent upper cell, each insulating cup having an opening therein permitting series connection between adjacent cells, the bottom of each upper insulating cup closing the next adjacent lower insulating cup and having the carbon electrode secured thereto in liquid tight relation.

15. A dry cell battery unit comprising an outer casing, a plurality of dry cells arranged within said casing in stacked relation and connected in series and held under pressure, each cell comprising a negative electrode and a mass of mix containing a positive electrode, a thin envelope of insulating material enveloping and insulating each cell but permitting series connection between adjacent cells, each positive electrode having an exposed surface having electrical contact with the next adjacent negative electrode, and means securing each of said envelopes of insulating material to the next adjacent positive electrode in liquid-tight relation.

16. A dry cell battery unit comprising an outer casing, a plurality of dry cells arranged within said casing in stacked relation and connected in series and held under pressure, each cell comprising a negative electrode and a mass of mix containing a positive electrode, a thin envelope of insulating material enveloping and insulating each cell but permitting series connection between adjacent cells, each positive electrode having an exposed surface having electrical contact with the next adjacent negative electrode, and means securing each of said envelopes of insulating material to the next adjacent positive electrode in liquid-tight relation, each said insulating envelope overlapping the envelope of the next adjacent cell and having the characteristics and qualities of Pliofilm.

CYRIL P. DEIBEL.